United States Patent
Hammond et al.

(10) Patent No.: US 10,126,099 B1
(45) Date of Patent: Nov. 13, 2018

(54) THERMAL REFLEX SIGHT

(71) Applicant: Steiner eOptics, Inc., Waitsfield, VT (US)

(72) Inventors: Marc R. Hammond, Waitsfield, VT (US); Robert J. Kogut, Waitsfield, VT (US); Adam Pasternak, Waitsfield, VT (US)

(73) Assignee: Steiner eOptics, Inc., Waitsfield, VT (US)

(*) Notice: Subject to any disclaimer, the term of this patent is extended or adjusted under 35 U.S.C. 154(b) by 0 days.

(21) Appl. No.: 15/592,536

(22) Filed: May 11, 2017

(51) Int. Cl.
| | |
|---|---|
| *F41G 1/35* | (2006.01) |
| *F41G 1/34* | (2006.01) |
| *H04N 5/33* | (2006.01) |
| *H04N 5/232* | (2006.01) |
| *H04N 5/278* | (2006.01) |
| *G02B 23/12* | (2006.01) |
| *G03B 13/06* | (2006.01) |
| *F41G 3/16* | (2006.01) |
| *F41G 1/38* | (2006.01) |

(52) U.S. Cl.
CPC ............ *F41G 1/345* (2013.01); *F41G 3/165* (2013.01); *G02B 23/12* (2013.01); *G03B 13/06* (2013.01); *H04N 5/23293* (2013.01); *H04N 5/278* (2013.01); *H04N 5/332* (2013.01); *F41G 1/38* (2013.01)

(58) Field of Classification Search
CPC ..... F41G 1/30; F41G 1/32; F41G 1/34; G02B 23/105
USPC ......... 42/113, 130, 131, 120, 132, 146, 145, 42/111, 115
See application file for complete search history.

(56) References Cited

U.S. PATENT DOCUMENTS

| | | | |
|---|---|---|---|
| 5,901,452 A * | 5/1999 | Clarkson | F41G 1/345 42/131 |
| 5,903,996 A | 5/1999 | Morley | |
| 6,020,994 A | 2/2000 | Cook | |
| 6,121,600 A | 9/2000 | Saldana et al. | |
| 6,204,961 B1 | 3/2001 | Anderson et al. | |
| 6,646,799 B1 | 11/2003 | Korniski et al. | |
| 6,781,127 B1 | 8/2004 | Wolff et al. | |
| 7,051,469 B1 | 5/2006 | Pochapsky et al. | |
| 7,057,647 B1 | 6/2006 | Monroe | |
| 7,171,776 B2 | 2/2007 | Staley, III | |
| 7,307,793 B2 | 12/2007 | Ottney et al. | |
| 7,319,557 B2 | 1/2008 | Tai | |
| 7,333,270 B1 | 2/2008 | Pochapsky et al. | |
| 7,345,277 B2 | 3/2008 | Zhang | |
| 7,483,213 B2 | 1/2009 | Pochapsky | |
| 7,541,581 B2 | 6/2009 | Reed et al. | |
| 7,796,329 B2 * | 9/2010 | Dobschal | F41G 1/30 359/1 |
| 8,915,008 B2 | 12/2014 | Mauricio et al. | |
| 8,970,737 B2 | 3/2015 | Keitzer et al. | |
| 9,057,583 B2 | 6/2015 | Matthews et al. | |

(Continued)

*Primary Examiner* — Reginald S Tillman, Jr.
(74) *Attorney, Agent, or Firm* — Innovation Counsel LLP

(57) ABSTRACT

A reflex sight comprises two apertures. One aperture is a direct view optical path of the target scene. The other aperture is a digital (e.g., thermal) camera or image intensifier. A beam combiner with two reflective surfaces (for example, a Bauernfeind, Penta, or other prism bonded to a wedge prism) and afocal eyepiece optics overlay the digital image or intensified image onto the direct view scene with matched magnification.

32 Claims, 8 Drawing Sheets

(56) References Cited

U.S. PATENT DOCUMENTS

| | | | |
|---|---|---|---|
| 9,069,172 B1 | 6/2015 | Morley | |
| 9,482,803 B2 * | 11/2016 | Dehmlow | G02B 5/32 |
| 2007/0109638 A1 * | 5/2007 | Tai | F41G 1/32 |
| | | | 359/399 |
| 2008/0295380 A1 * | 12/2008 | Buckingham | F41G 1/345 |
| | | | 42/131 |

* cited by examiner

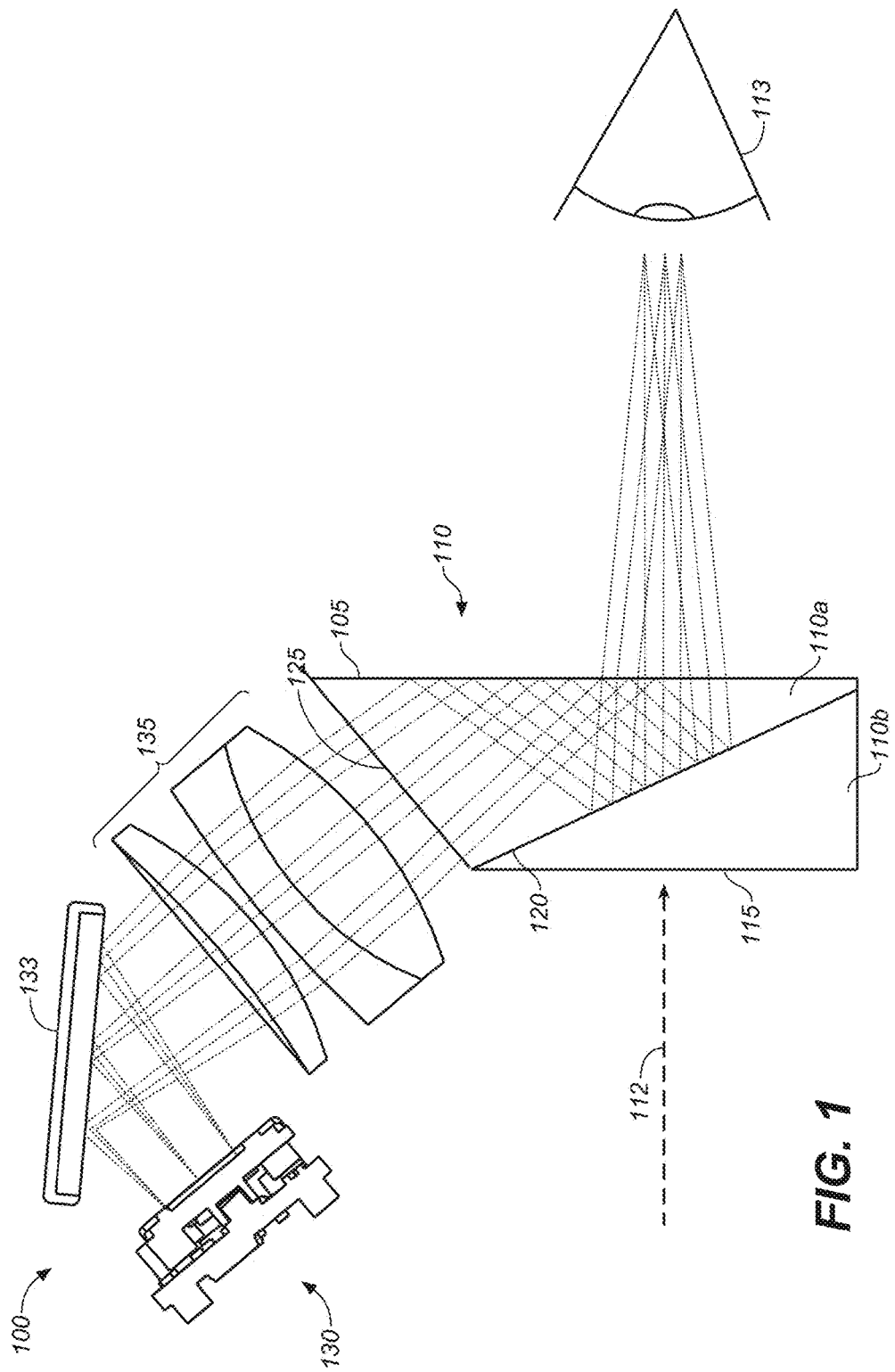

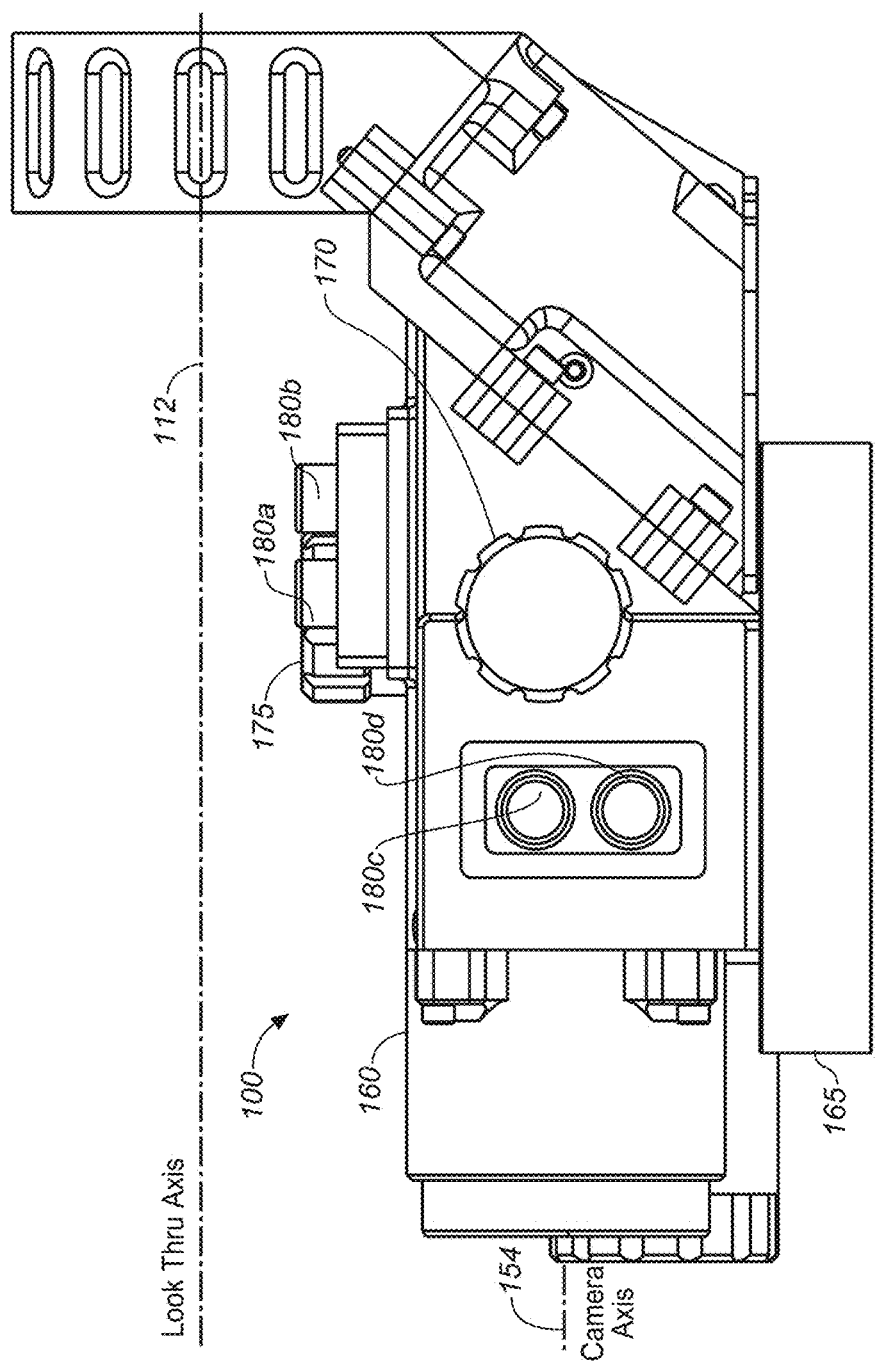

THERMAL REFLEX SIGHT

This invention was made with government support under the Small Business Innovation Research program via contract number W909MY-14-C-000 awarded by the U.S. Army Night Vision and Electronic Systems Directorate. The government has certain rights in the invention.

FIELD OF THE INVENTION

The invention relates generally to firearm aiming sights.

BACKGROUND

Firearm aiming sights may use a thermal imaging camera to capture a thermal (infrared) image of a target scene and display the image in visible light on a display viewed by the user in order to enhance night-time and other low light vision or to detect warm objects through foliage, camouflage, fog, dust, or other obscurants. Alternatively, such aiming sights may use an image intensifier or other high sensitivity camera or imaging system to amplify low levels of visible light from the target scene or image other spectral bands of light not detectable by the human eye and display the resulting images to the operator via a phosphor screen or other type of display. In either case, it may be advantageous to superimpose the image from the camera or the intensifier on a direct view image of the target scene.

SUMMARY

This specification discloses thermal reflex sights that fuse (superimpose) an image of a target scene from a thermal or other digital camera or an image of the target scene from an image intensifier onto a direct view of the target scene. The reflex sights comprise two apertures. One aperture is a direct view optical path of the target scene. The other aperture is the objective lens for the digital camera or image intensifier. A beam combiner with two reflective surfaces (for example, a Bauernfeind, Penta, or other prism bonded to a wedge prism) and an afocal eyepiece overlay the digital image or intensified image of the target scene onto the direct view scene with matched magnification. The digital image can be static or dynamic and can comprise text and/or symbology and/or video from a thermal (mid or long wave infrared), short wave infrared, image intensified, near infrared, ultraviolet, or visible spectrum sensitive camera.

If the thermal reflex sight comprises a digital camera, the digital camera may be housed with the camera display and the beam combiner in a shared housing adapted to be mounted on a firearm. Alternatively, the camera display and beam combiner may be housed in a shared housing adapted to be mounted to a firearm, and the camera may be housed in a separate housing also adapted to be mounted to the firearm. The housings may mount to the firearm via a conventional Picatinny rail, for example.

The thermal reflex sight may operate with unity magnification. Alternatively, the thermal reflex sight may be adapted to attach to a magnifying telescopic sight with the direct view optical path passing through the magnifying scope. In the latter variation, the camera may be housed separately from the other components in a housing adapted to be mounted to a firearm.

These and other embodiments, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIG. 1 shows an arrangement of optical components in an example embodiment of a thermal reflex sight.

FIGS. 2A-2C show the arrangement of optical components of FIG. 1 integrated in a shared housing with a camera in an example embodiment of a thermal reflex sight.

DETAILED DESCRIPTION

Figure 2A:
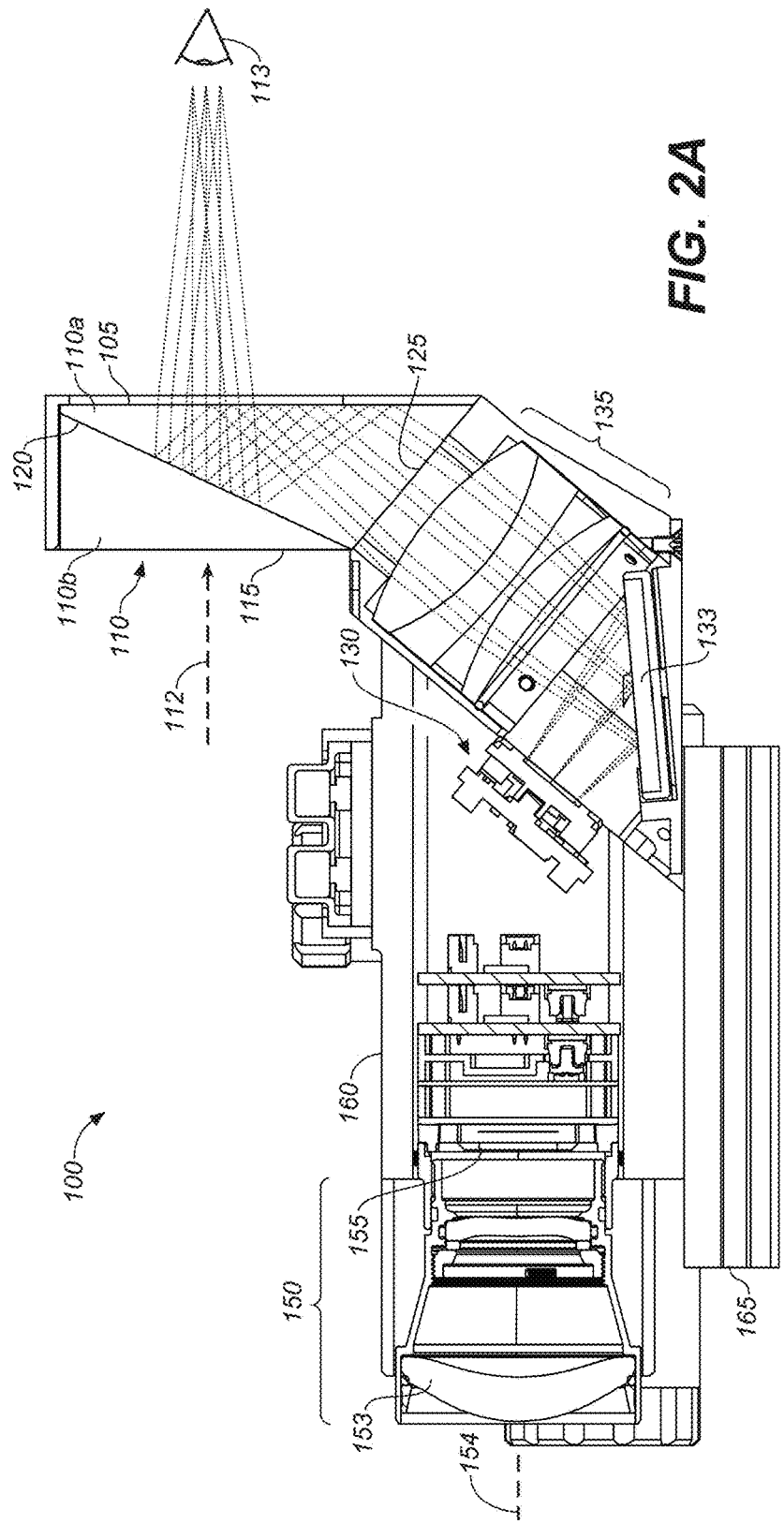

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used in this specification and the appended claims, the singular forms "a," "an," and "the" include plural referents unless the context clearly indicates otherwise. Also, the term "parallel" is intended to include "substantially parallel" geometries, that is, to encompass minor inconsequential deviations from parallel geometries. The term "perpendicular" is intended to include substantially perpendicular geometries, that is, to encompass minor inconsequential deviations from perpendicular geometries. The term "planar" is intended to include substantially planar geometries, that is, to encompass minor inconsequential deviations from planar geometries.

FIG. 1 shows an arrangement of optical components in one example of a thermal reflex sight 100. In this example, beam combiner 110 comprises a planar outer surface 105 oriented perpendicularly to a first axis 112, a planar outer surface 115 oriented parallel to and oppositely positioned from the planar outer surface 105, an internal planar surface 120 oriented at an acute angle with respect to the outer planar surfaces 105 and 115, and a planar outer surface 125. Internal planar surface 120 is coated with a partially reflective coating. In this example, the reflex sight comprises a digital display 130 for a digital camera (not shown). The reflex sight also comprises an afocal eyepiece 135.

Still referring to FIG. 1, a first optical path through reflex sight 100 is coaxial with first axis 112 and provides to a user (e.g., user eye 113) a direct view in the visible spectrum straight through outer planar surfaces 105, 115 of the beam combiner of a target scene at which the aiming sight is aimed.

Along a second optical path through the reflex sight the afocal eyepiece 135 collects visible light rays from digital camera display 130 to produce afocal light rays that are incident on and transmitted through planar outer surface 125 of the beam combiner. In the illustrated example, optional mirror 133 reflects the visible light rays from display 130 to afocal eyepiece 135, but other arrangements may be used instead if suitable. After passing through planar outer surface 125 of the beam combiner, the afocal light rays from the eyepiece are incident on planar outer surface 105 of the beam combiner from inside the beam combiner at an angle resulting in total internal reflection of the rays by planar outer surface 105 toward internal coated planar surface 120. The internal coated planar surface reflects the afocal light rays along the first axis as an afocal image of the target scene overlaying the direct view of the target scene with matched magnification. Light rays from display 130 are thus reflected twice in beam combiner 110, first by total internal reflection at planar outer surface 105, then by partially reflective coated surface 120. This arrangement allows beam combiner 110 to have an advantageously thin profile as measured along first axis 112.

Display 130 may be or comprise, for example, a liquid crystal display (LCD) or an organic light emitting diode display (OLED). In an alternative variation of example reflex sight 100, the reflex sight comprises an image intensifier rather than a digital camera. In that case display 130 is replaced by a phosphor screen at the output of the image intensifier.

The partially reflective coating on internal planar surface 120 allows a portion of the visible spectrum to pass straight through beam combiner 110 parallel to first axis 112 to provide the direct view to the user. In addition, the partially reflective coating reflects a portion of the visible spectrum including wavelengths of light emitted by display 130 (or alternatively, emitted by the phosphor screen of an image intensifier) to overlay the image from the second optical path with the direct view.

In one variation, the partially reflective coating on internal planar surface 120 of the beam combiner is a narrow spectral band reflective coating and the light emitted by display 130 (or the phosphor screen of an image intensifier) is substantially monochromatic with a center wavelength closely coinciding with the center wavelength of the narrow band reflective coating such that the display light or phosphor screen light is substantially reflected (e.g., greater than or equal to 95%) toward the user's eye. The narrow band reflective coating on surface 120 is also known as a trichroic coating. Such a coating, for example, can be designed to reflect a high proportion of light within a spectral band from 590 to 610 nm while transmitting a high proportion of visible light with wavelengths less than 590 nm and greater than 610 nm. This results in high display brightness reaching the user's eye while retaining high overall light transmission from the outside through the beam combiner to the user's eye.

In another variation, the partially reflective coating on internal planar surface 120 of the beam combiner is a short pass coating that is transmissive for visible wavelengths shorter than a cutoff wavelength and highly reflective for visible wavelengths longer than the cutoff wavelength. The cutoff wavelength may be, for example approximately 600 nm, approximately 610 nm, approximately 630 nm, or approximately 650 nm.

The partially reflective coating on internal planar surface 120, whether it is a narrow band reflective coating or a short pass coating, may be selected to be highly reflective for a selected range of red light wavelengths and transmissive for shorter visible wavelengths. In such cases transmission of the full visible spectrum through the coated surface along first axis 112 (in the direct view) may be greater than or equal to about 85%, for example. The loss of red light from the direct view optical path as a result of reflection from coated surface 120 typically does not significantly degrade the direct view, because red light is less valuable to human vision than are the shorter visible wavelengths.

Beam combiner 110 may be formed, for example, by bonding a Bauernfeind, Penta, or other prism 110a to a wedge prism 110b along internal surface (e.g., interface) 120. The presence of wedge prism 110b with outer planar surface 115 parallel to outer planar surface 105 provides an undistorted look-through for the direct view optical path.

A digital camera providing a signal to display 130 may be sensitive to wavelengths in the ultraviolet spectral range of about 200 nm to about 400 nm, the visible spectral range of about 400 nm to about 700 nm, the near infrared spectral range of about 700 nm to about 1100 nm, or the short wave infrared spectral range of about 1100 nm to about 3000 nm. In some variations, the digital camera detects light in the long wave infrared (LWIR) spectral range of about 7000 nm to about 12000 nm. In other variations, the digital camera detects light in the mid wave infrared (MWIR) spectral range of about 3000 nm to about 5000 nm. Digital cameras used in the invention may employ focal plane array technologies including, but not limited to, charge coupled device (CCD), complementary semiconductor oxide (CMOS), silicon (Si), indium gallium arsenide (InGaAs), indium antimonide (InSb), microbolometers, or mercury cadmium telluride (MCT or HgCdTe).

Display 130 may be or comprise, for example, an 800× 600, 15 micron pixel, OLED micro-display. Display 130 may be or comprise, for example, a 640×480, 15 micron pixel, LCD micro-display. Any other suitable digital display may also be used.

An image intensifier, if present, may be sensitive to light in the range of, for example, about 380 nm to about 900 nm.

In some variations reflex sight 100 may have a field of view of, for example, about 16 degrees horizontally by about 12 degrees vertically (about 20 degrees diagonally).

Figure 2C:
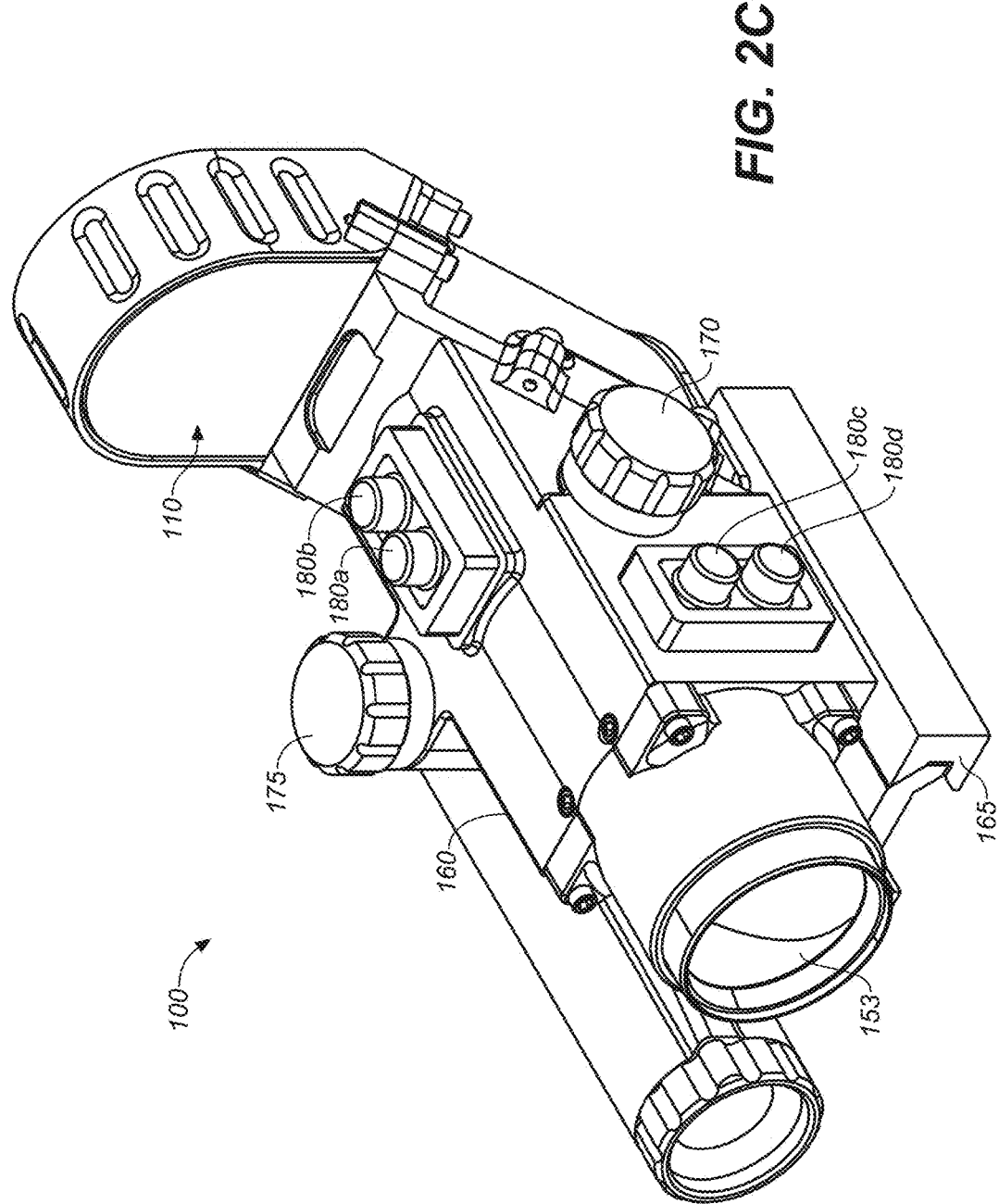

FIGS. 2A-2C show an example embodiment of thermal reflex sight 100 comprising a digital camera 150 integrated in a shared housing 160 with the components shown in FIG. 1. FIG. 2A is a cross-sectional view showing the internal components. FIG. 2B is a side view, and FIG. 2C is a perspective view. Camera 150 comprises an objective lens assembly 153 that collects light along camera axis 154 and images it onto a focal plane array 155, which provides a signal representing the image to display 130. Camera axis 154 may be substantially parallel to first axis 112. Alternatively, camera axis 154 may intersect axis 112 at a distance from thermal reflex sight 100.

Housing 150 may be adapted to mount to a firearm, for example via Picatinny rail mount 165. User interface controls such as rotatable knobs 170 and 175 and switches (buttons) 180A-180D may be used to adjust windage and elevation to align first axis 112 and camera axis 153 as desired with respect to the firearm on which the reflex sight is mounted and control the camera and/or camera display (or alternatively, an image intensifier if present). In some variations windage and elevation (more generally, bore sight alignment) adjustments may be made electronically by shifting the position on display 130 at which the image from camera 150 is displayed.

In the example illustrated in FIGS. 2A-2C, thermal reflex sight 100 is about 115 mm, about 40 mm wide, and about 40 mm tall, with a direct view aperture of about 30 mm. Any other suitable dimensions may also be used.

Figure 2D:
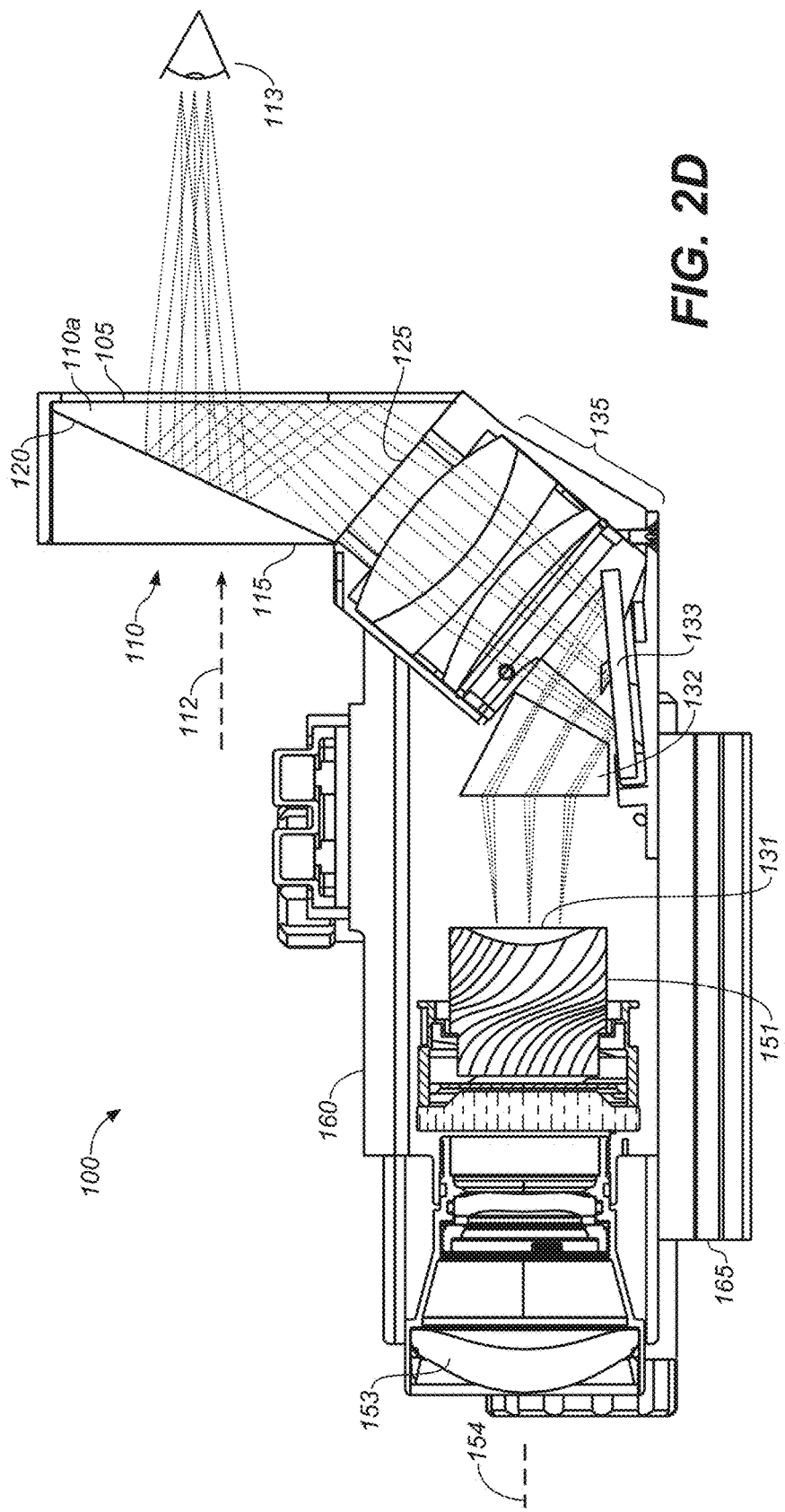
FIG. 2D shows an example embodiment comprising an image intensifier rather than a camera but otherwise similar or identical to the example embodiment shown in FIGS. 2A-2C.

FIG. 2D shows a cross-sectional view of an example embodiment of thermal reflex sight 100 comprising an image intensifier 151 (rather than a camera) integrated in a shared housing 160 with the components shown in FIG. 1. In this example objective lens assembly 153 collects light along image intensifier axis 154 and focuses it into image intensifier 151, which displays an intensified image on phosphor screen 131. Light rays from phosphor screen 131 are directed onto mirror 133 by prism 132, and thence through afocal eyepiece 135 and beam combiner 110. Apart from use of an image intensifier rather than a camera and minor changes to the optical paths (e.g., use of prism 132) to accommodate that change, the structure and operation of this embodiment of reflex sight 100 is similar or identical to that described above with respect to FIGS. 2A-2C.

Figure 3A:
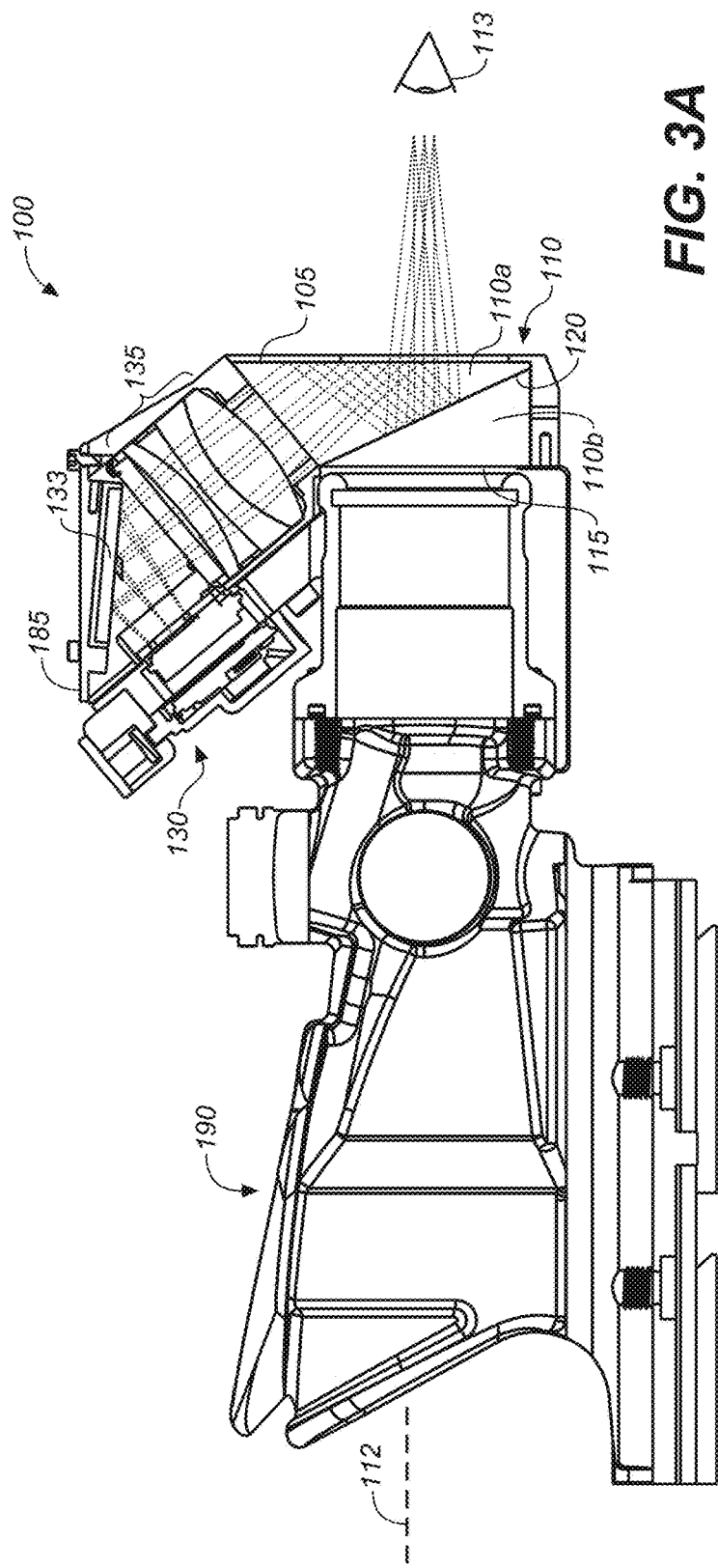
FIG. 3A shows the arrangement of optical components of FIG. 1 in a housing attached to a magnifying scope with the direct view optical path through the reflex sight passing through the scope in another example embodiment of a thermal reflex sight.
Figure 3B:
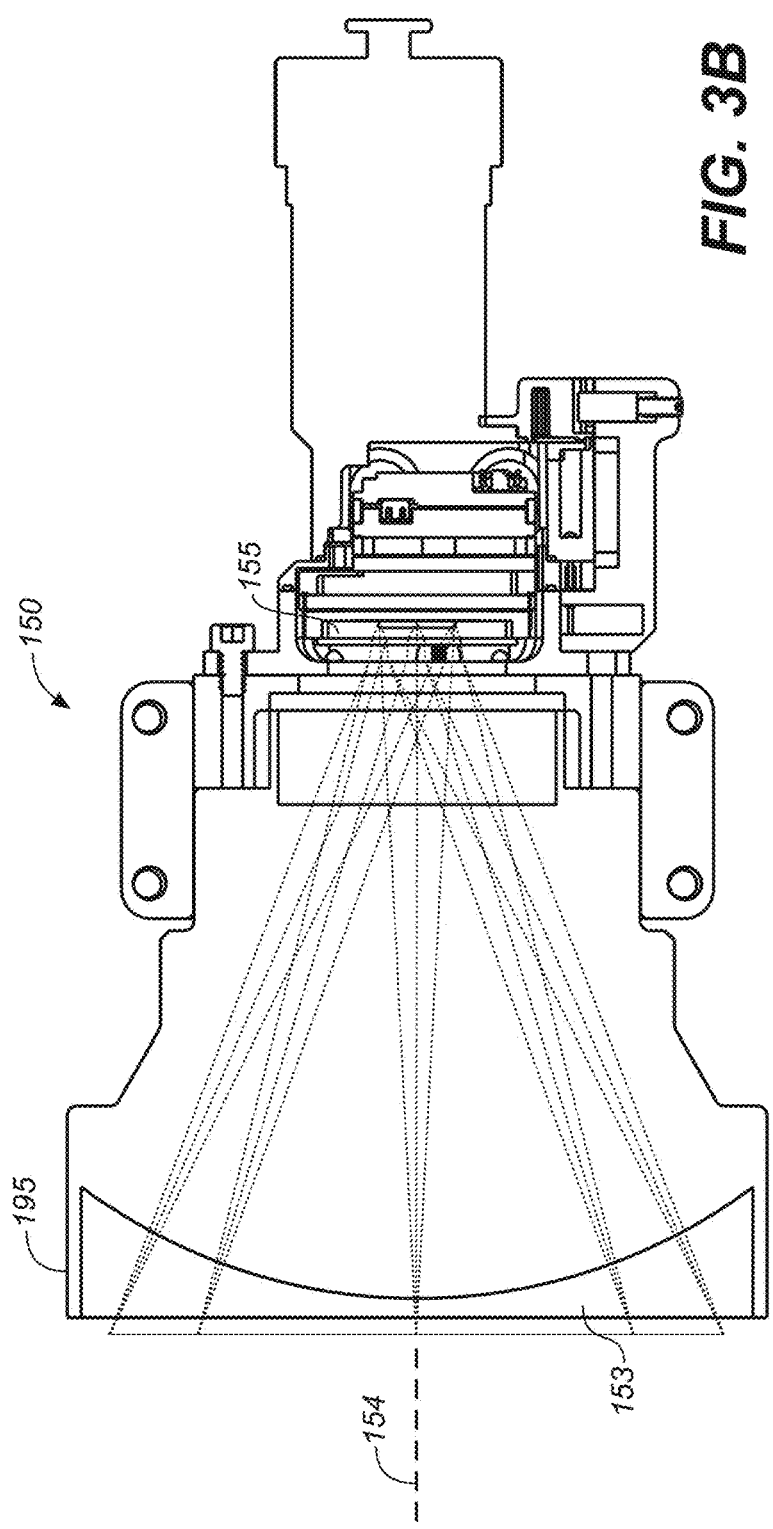
FIG. 3B shows a separately housed camera which may be used in combination with the arrangement shown in FIG. 3A.

FIG. 3A shows an example embodiment of thermal reflex sight 100 in which the components shown in FIG. 1 are housed in a housing 185 adapted to attach (e.g., clip on) to a magnifying telescopic sight 190 with the direct view optical path through the reflex sight passing through the magnifying scope. In FIG. 3A reflex sight 100 is shown in cross-section, and magnifying scope 190 is shown in a corresponding side view. Scope 190 may provide a magnification of, for example, 1x to 5X. FIG. 3B shows a cross-sectional view of camera 150 housed separately from the components shown in FIG. 1 in a housing 195, which may be attached for example to a side rail on a firearm to which magnifying scope 190 is mounted with camera axis 154 parallel to first axis 112, or with camera axis 154 intersecting first axis 112 at some distance.

Figure 4A:
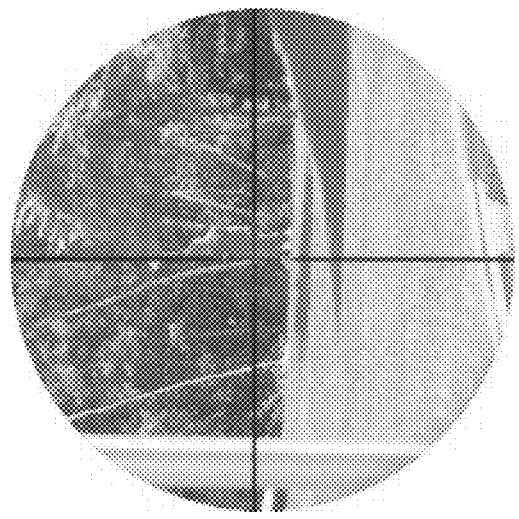
FIGS. 4A-4C show views of a target scene through an example embodiment of a thermal reflex sight.
Figure 4B:
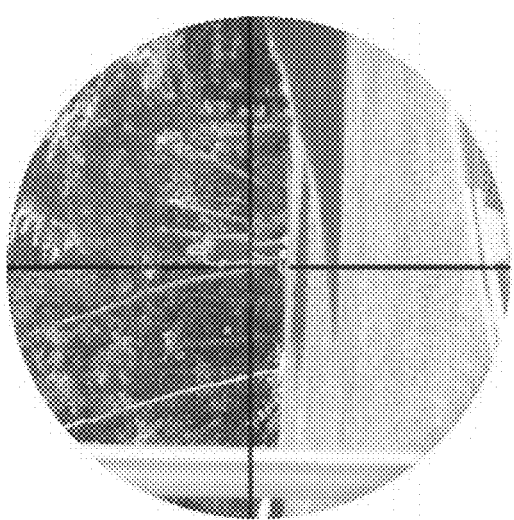
Figure 4C:
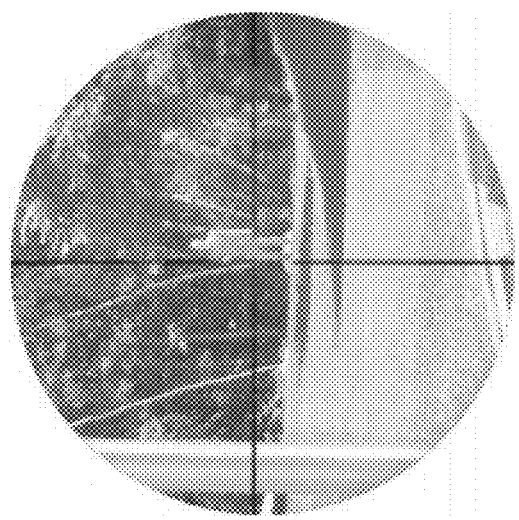

In some variations, display 130 in thermal reflex sight 100 may be operated to present, for example, a low intensity image of the target scene, a full (e.g., thermal) image of the target scene, an outline image of (e.g., thermally) bright portions of the target scene, a mixed outline/low intensity image, or no image. Reflex sight 100 may be switched between these modes using buttons 180A-180D, for example. As examples of several of these modes, FIG. 4A shows a direct view of a target scene (a person standing at the edge of a forest) without a fused (e.g., thermal) image, FIG. 4B shows an outline image of the same target scene fused with the direct view, and FIG. 4C shows a full (e.g., thermal) image of the target scene fused with the direct view. Display 130 may also be operated to present a red dot, reticle, crosshair, or combination thereof in the fused image to provide a reference for where the firearm is aimed.

Although reflex sight 100 is referred to herein as a "thermal" reflex sight, the term thermal is not meant to be limiting. Camera 150, or an image intensifier used in its place, may be selected to be sensitive to visible wavelengths of light or to wavelengths of light outside human vision other than, or in addition to, thermal infrared wavelengths. In such cases, display 130, or the phosphor screen of an image intensifier, presents an image based at least in part on light collected at those other non-thermal wavelengths.

This disclosure is illustrative and not limiting. Further modifications will be apparent to one skilled in the art in light of this disclosure and are intended to fall within the scope of the appended claims.

What is claimed is:

1. An aiming sight comprising:
 a beam combiner comprising a first planar outer surface oriented perpendicularly to a first axis, a second planar outer surface oriented parallel to and oppositely positioned from the first planar outer surface, an internal coated planar surface oriented at an acute angle with respect to the first and second outer planar surfaces, and a third planar outer surface;
 either an image intensifier or a display for a digital camera;
 an afocal eyepiece; and
 a first housing comprising the beam combiner, the image intensifier or display for a digital camera, and the afocal eyepiece;
 wherein the housing is adapted to be attached to a firearm;
 wherein a first optical path is coaxial with the first axis and provides a direct view in the visible spectrum straight through the first and second outer planar surfaces of the beam combiner of a target scene at which the aiming sight is aimed;
 wherein along a second optical path the afocal eyepiece collects light from the image intensifier or the digital camera display to produce afocal light rays that are incident on and transmitted through the third planar outer surface of the beam combiner, then incident on the first planar outer surface of the beam combiner from inside the beam combiner at an angle resulting in total internal reflection of the rays by the first planar outer surface toward the internal coated planar surface, then reflected by the internal coated planar surface along the first axis as an afocal image of the target scene overlaying and magnification matched with the direct view of the target scene.

2. The aiming sight of claim 1 comprising a digital camera display, wherein the first housing comprises a digital camera connected to provide a signal to the digital camera display.

3. The aiming sight of claim 1 comprising a digital camera display, wherein:
 a digital camera configured to provide a signal to the digital camera display is housed in a separate housing adapted for mounting to the firearm; and
 the first housing is adapted to be attached to a firearm telescopic magnifying scope with the direct view optical path passing through the magnifying scope.

4. The aiming sight of claim 1 comprising an image intensifier.

5. The aiming sight of claim 1, wherein a coating on the internal coated surface reflects visible light having a wavelength greater than a cutoff wavelength and transmits light having a wavelength shorter than a cutoff wavelength, and the light from the image intensifier or digital camera display has a wavelength greater than the cutoff wavelength.

6. The aiming sight of claim 1, wherein a coating on the internal coated surface is a narrow spectral band reflective coating and the light emitted by the digital camera display or image intensifier is substantially monochromatic with a center wavelength closely coinciding with the center wavelength of the narrow band reflective coating.

7. The aiming sight of claim 1 comprising a digital camera display connected to receive a signal from a digital camera, wherein the display is controllable to provide a full image of the target scene, an outline image of bright portions of the target scene, or a mixed full and outline image of the target scene.

8. The aiming sight of claim 1 comprising a digital camera display connected to receive a signal from a digital camera, wherein the display is controllable to overlay a dot, reticle, crosshair, or combination thereof with the afocal image and direct view to provide a reference for where the firearm is aimed.

9. The aiming sight of claim 1 comprising a digital camera display connected to receive a signal from a digital camera sensitive to light in the ultraviolet spectral range of about 200 nm to about 400 nm.

10. The aiming sight of claim 1 comprising a digital camera display connected to receive a signal from a digital camera sensitive to light in the visible spectral range of about 400 nm to about 700 nm.

11. The aiming sight of claim 1 comprising a digital camera display connected to receive a signal from a digital camera sensitive to light in the near infrared spectral range of about 700 nm to about 1100 nm.

12. The aiming sight of claim 1 comprising a digital camera display connected to receive a signal from a digital camera sensitive to light in the short wave infrared spectral range of about 1100 nm to about 3000 nm.

13. The aiming sight of claim 1 comprising a digital camera display connected to receive a signal from a digital camera sensitive to light in the mid wave infrared (MWIR) spectral range of about 3000 nm to about 5000 nm.

14. The aiming sight of claim 1 comprising a digital camera display connected to receive a signal from a digital camera sensitive to light in long wave infrared (LWIR) spectral range of about 7000 nm to about 12000 nm.

15. The aiming sight of claim 1 comprising a digital camera display, wherein:
  the first housing comprises a digital camera connected to provide a signal to the digital camera display; and
  the display is controllable to provide a full image of the target scene, an outline image of bright portions of the target scene, or a mixed full and outline image of the target scene.

16. The aiming sight of claim 15, wherein a coating on the internal coated surface reflects visible light having a wavelength greater than a cutoff wavelength and transmits light having a wavelength shorter than a cutoff wavelength, and the light from the digital camera display has a wavelength greater than the cutoff wavelength.

17. The aiming sight of claim 15, wherein a coating on the internal coated surface is a narrow spectral band reflective coating and the light emitted by the digital camera display is substantially monochromatic with a center wavelength closely coinciding with the center wavelength of the narrow band reflective coating.

18. The aiming sight of claim 15 wherein the digital camera is sensitive to light in the ultraviolet spectral range of about 200 nm to about 400 nm.

19. The aiming sight of claim 15 wherein the digital camera is sensitive to light in the visible spectral range of about 400 nm to about 700 nm.

20. The aiming sight of claim 15 wherein the digital camera is sensitive to light in the near infrared spectral range of about 700 nm to about 1100 nm.

21. The aiming sight of claim 15 wherein the digital camera is sensitive to light in the short wave infrared spectral range of about 1100 nm to about 3000 nm.

22. The aiming sight of claim 15 wherein the digital camera is sensitive to light in long wave infrared (LWIR) spectral range of about 7000 nm to about 12000 nm.

23. The aiming sight of claim 15 wherein the digital camera is sensitive to light in the mid wave infrared (MWIR) spectral range of about 3000 nm to about 5000 nm.

24. The aiming sight of claim 1 comprising a digital camera display, wherein:
  a digital camera configured to provide a signal to the digital camera display is housed in a separate housing adapted for mounting to the firearm;
  the first housing is adapted to be attached to a firearm telescopic magnifying scope with the direct view optical path passing through the magnifying scope; and
  the display is controllable to provide a full image of the target scene, an outline image of bright portions of the target scene, or a mixed full and outline image of the target scene.

25. The aiming sight of claim 24, wherein a coating on the internal coated surface reflects visible light having a wavelength greater than a cutoff wavelength and transmits light having a wavelength shorter than a cutoff wavelength, and the light from the digital camera display has a wavelength greater than the cutoff wavelength.

26. The aiming sight of claim 24, wherein a coating on the internal coated surface is a narrow spectral band reflective coating and the light emitted by the digital camera display is substantially monochromatic with a center wavelength closely coinciding with the center wavelength of the narrow band reflective coating.

27. The aiming sight of claim 24 wherein the digital camera is sensitive to light in the ultraviolet spectral range of about 200 nm to about 400 nm.

28. The aiming sight of claim 24 wherein the digital camera is sensitive to light in the visible spectral range of about 400 nm to about 700 nm.

29. The aiming sight of claim 24 wherein the digital camera is sensitive to light in the near infrared spectral range of about 700 nm to about 1100 nm.

30. The aiming sight of claim 24 wherein the digital camera is sensitive to light in the short wave infrared spectral range of about 1100 nm to about 3000 nm.

31. The aiming sight of claim 24 wherein the digital camera is sensitive to light in long wave infrared (LWIR) spectral range of about 7000 nm to about 12000 nm.

32. The aiming sight of claim 24 wherein the digital camera is sensitive to light in the mid wave infrared (MWIR) spectral range of about 3000 nm to about 5000 nm.

* * * * *